(12) United States Patent
Beuschel et al.

(10) Patent No.: US 10,711,911 B2
(45) Date of Patent: Jul. 14, 2020

(54) PRESSURE DISTRIBUTOR FOR A MOTOR VEHICLE

(71) Applicant: Conti Temic microelectronic GmbH, Nuremberg (DE)

(72) Inventors: Michael Beuschel, Stammham (DE); Gerhard Berghoff, Manching (DE); Alexander Kerler, Titting OT Petersbuch (DE)

(73) Assignee: Conti Temic microelectronic GmbH, Nuremberg (DE)

( * ) Notice: Subject to any disclaimer, the term of this patent is extended or adjusted under 35 U.S.C. 154(b) by 27 days.

(21) Appl. No.: 15/766,245

(22) PCT Filed: Sep. 21, 2016

(86) PCT No.: PCT/EP2016/072353
§ 371 (c)(1),
(2) Date: Apr. 5, 2018

(87) PCT Pub. No.: WO2017/060079
PCT Pub. Date: Apr. 13, 2017

(65) Prior Publication Data
US 2019/0118690 A1   Apr. 25, 2019

(30) Foreign Application Priority Data
Oct. 5, 2015   (DE) .......................... 10 2015 219 207

(51) Int. Cl.
*F16K 27/00* (2006.01)
*F16K 31/06* (2006.01)
(Continued)

(52) U.S. Cl.
CPC .......... *F16K 31/0627* (2013.01); *B60N 2/914* (2018.02); *B60N 2/976* (2018.02);
(Continued)

(58) Field of Classification Search
CPC ..... Y10T 137/87877; Y10T 137/87885; F16K 27/003; F16K 11/044; F16K 11/20;
(Continued)

(56) References Cited

U.S. PATENT DOCUMENTS 2,598,961 A * 6/1952 Andrus ................. A01G 25/02
137/883
2,821,997 A * 2/1958 Clay ................... F16K 31/0606
137/596.17
(Continued)

FOREIGN PATENT DOCUMENTS

DE    102004044497 B3    4/2006
DE    102006020277 A1    10/2007
(Continued)

OTHER PUBLICATIONS

Office Action dated Aug. 10, 2016 for corresponding German Patent Application No. 10 2015 219 207.5.
(Continued)

*Primary Examiner* — Seth W. Mackay-Smith

(57) ABSTRACT

The disclosure relates to a pressure distributor for a motor vehicle, in particular for pneumatic actuators in seats, wherein a pressure generator and a plurality of pneumatic actuators can be connected to the pressure distributor, wherein each actuator is assigned at least one electrically controllable valve which forwards a pressure which is generated by the pressure generator in a targeted manner via a respective outlet to the actuator which is assigned to it, wherein the plurality of valves are supplied with compressed air by the pressure generator during operation of the pressure distributor via a respective inlet of a common air inlet line. The common air inlet line is connected as a separate component via a releasable connection to the plurality of valves.

12 Claims, 2 Drawing Sheets

(51) Int. Cl.
   *F15B 13/08* (2006.01)
   *F16K 31/10* (2006.01)
   *B60N 2/90* (2018.01)

(52) U.S. Cl.
   CPC ............ *F16K 27/003* (2013.01); *F16K 31/10* (2013.01); *F15B 13/0814* (2013.01); *F15B 13/0821* (2013.01)

(58) Field of Classification Search
   CPC ............ F16K 31/0627; F16K 31/0651; F15B 13/0814; F15B 13/0817; F15B 13/0821; F15B 13/0835; F15B 13/0839; F15B 13/0878; F15B 13/0882; F15B 13/0885; F15B 13/0889; F15B 13/0892
   USPC .................................................. 251/129.22
   See application file for complete search history.

(56) References Cited

U.S. PATENT DOCUMENTS

| | | | | |
|---|---|---|---|---|
| 2,910,249 A * | 10/1959 | Gunkel | ............ | F16K 31/0658 239/548 |
| 2,922,614 A * | 1/1960 | Nickells | ............ | F16K 31/0689 251/54 |
| 3,528,639 A * | 9/1970 | Grayson | ............ | F16K 31/0682 251/75 |
| 4,399,836 A * | 8/1983 | de Versterre | ........ | F15B 13/0405 137/487.5 |
| 4,402,344 A * | 9/1983 | Kemmner | ................ | F02M 7/20 137/625.33 |
| 4,561,631 A * | 12/1985 | Slavin | ................... | F02B 37/186 251/129.2 |
| 4,637,433 A * | 1/1987 | Stoll | ................... | F16K 31/0606 137/625.65 |
| 4,733,697 A * | 3/1988 | Baun | ..................... | B05B 1/3006 137/340 |
| 4,925,155 A * | 5/1990 | Carman | .............. | F16K 31/0655 251/117 |
| 4,997,014 A * | 3/1991 | Weiler | ...................... | B65B 3/36 137/883 |
| 5,048,564 A * | 9/1991 | Gaiardo | ................ | F16K 27/003 137/599.07 |
| 5,421,366 A * | 6/1995 | Naffziger | ................. | F01N 3/22 137/614.19 |
| 5,458,048 A * | 10/1995 | Hohner | .............. | F15B 13/0814 137/624.2 |
| 5,588,465 A * | 12/1996 | Witowski | ............ | F15B 13/0402 137/596.16 |
| 6,076,803 A * | 6/2000 | Johnson | .............. | F16K 31/0651 251/129.22 |
| 6,109,298 A * | 8/2000 | Kaneko | .............. | F15B 13/0817 137/551 |
| 6,748,968 B1 * | 6/2004 | Parsons | ............... | F15B 13/0814 137/15.13 |
| 6,892,749 B2 * | 5/2005 | Fukano | ............... | F15B 13/0817 137/269 |
| 7,194,911 B2 * | 3/2007 | Bordonaro | ............ | F16K 27/003 73/756 |
| 7,261,122 B2 * | 8/2007 | Bordonaro | .......... | F15B 13/0817 137/269 |
| 7,591,280 B2 * | 9/2009 | Narita | ................. | F15B 13/0814 137/269 |
| 8,100,381 B2 * | 1/2012 | Roschke | ................. | F16K 31/04 137/613 |
| 2003/0183289 A1 * | 10/2003 | Seuret | ................. | F15B 13/0405 137/625.65 |
| 2005/0061302 A1 * | 3/2005 | Tatsu | .................. | F02M 25/0836 123/520 |
| 2005/0263196 A1 * | 12/2005 | Hsieh | ........................ | F17D 1/04 137/883 |
| 2007/0023724 A1 * | 2/2007 | Laue | .................. | F16K 31/0606 251/129.22 |
| 2015/0114490 A1 * | 4/2015 | Carpenter | ............... | E03B 7/072 137/460 |

FOREIGN PATENT DOCUMENTS

| | | |
|---|---|---|
| DE | 102005060217 B4 | 10/2008 |
| DE | 102011102701 B4 | 10/2013 |
| DE | 202014006875 U1 | 12/2014 |
| DE | 102013220561 A1 | 4/2015 |
| DE | 102008060342 B3 | 12/2016 |
| EP | 2461046 A1 | 6/2012 |
| WO | 2013011340 A1 | 1/2013 |
| WO | 2014/135909 A1 | 9/2014 |

OTHER PUBLICATIONS

International Search Report and Written Opinion dated Nov. 25, 2016 from corresponding International Patent Application No. PCT/EP2016/072353.

* cited by examiner

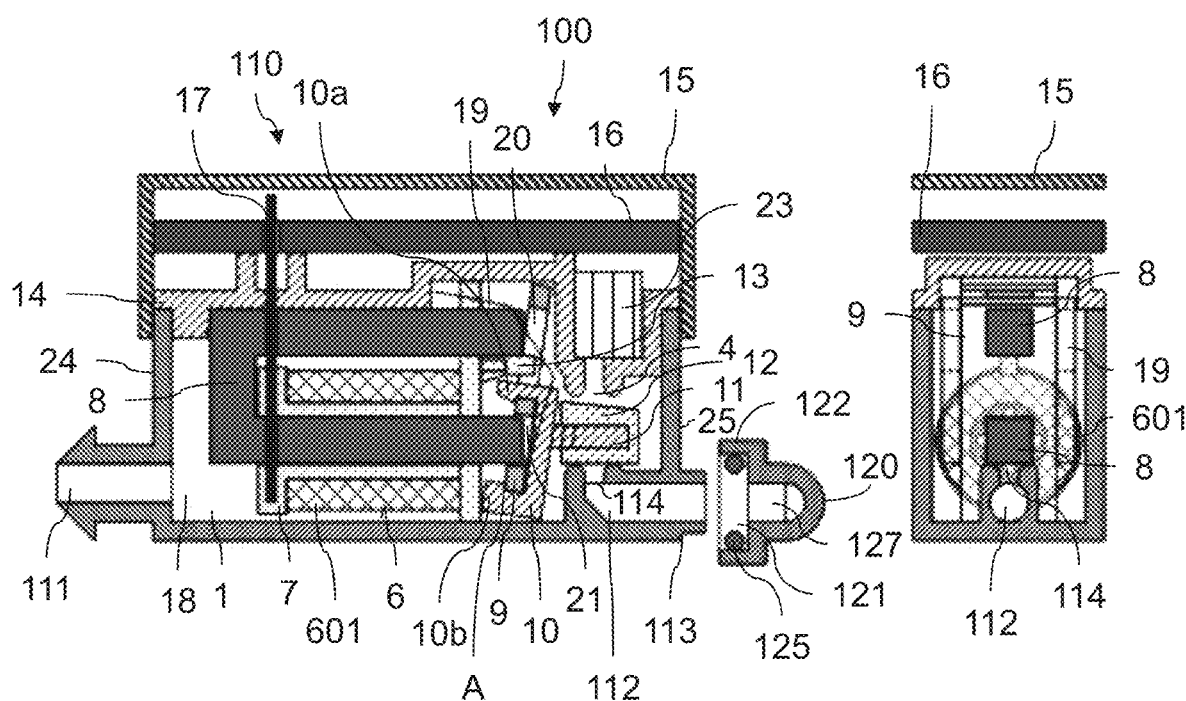
Fig. 1
Fig. 3
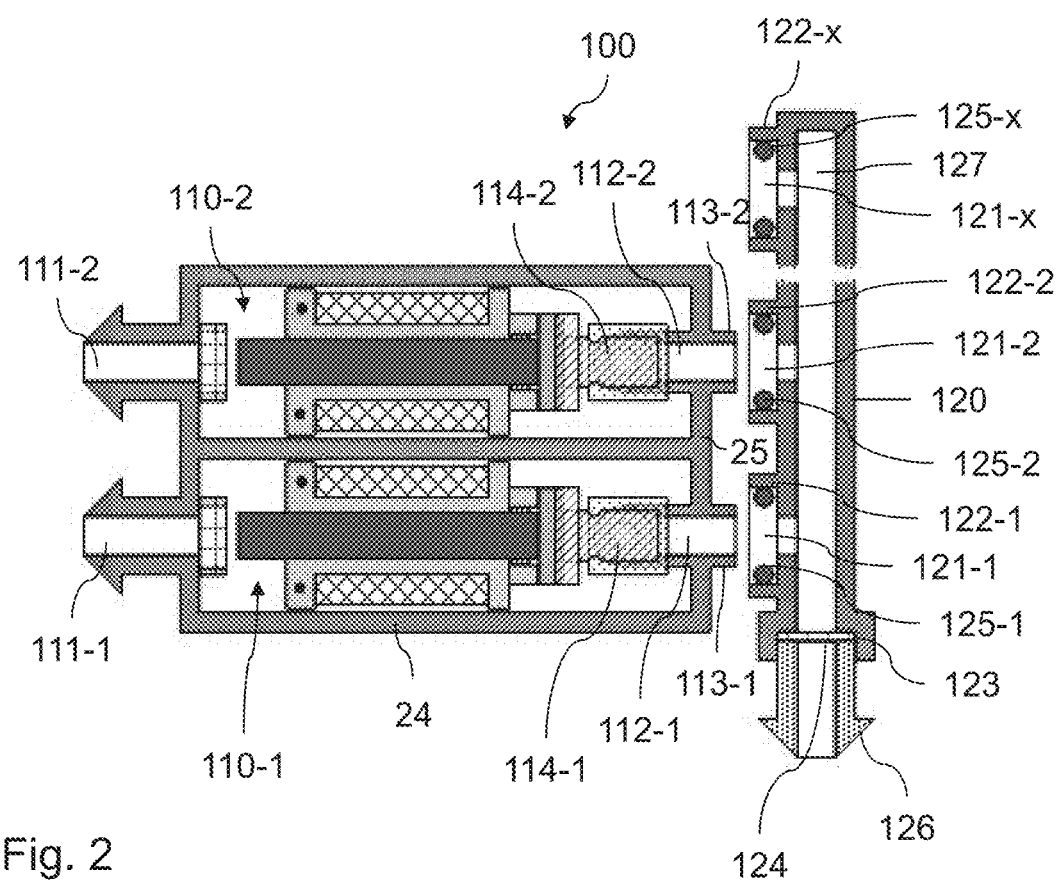
Fig. 2

PRESSURE DISTRIBUTOR FOR A MOTOR VEHICLE

Pneumatic or hydraulic actuators in motor vehicles require a defined supply of positive or negative pressure in order to move the actuator to a predefined position or to maintain said actuator therein. For example, pneumatic actuators are thus used in seats for the adjustment of the seat or for setting the volume and the pressure in pressurized air cushions, for example for shaping the seat in an individual manner or for implementing massaging functions in seats. The respective operating medium herein is generated at a defined pressure by a common pressure generator and is provided by way of controllable valves so as to correspond to the desired position or function, respectively, of the actuator, or pressure is released from the actuator, respectively.

An electrical circuit which generates electrical control signals for the individual, electrically controllable valves is provided for the control. The pressure at the actuator, or in the pressurized line to the latter, respectively, is monitored and a pressure regulation is implemented by this control and by respective sensors.

DE 10 2006 020 277 A1 proposes a pressure distributor which consists of a main body to which the valves and the control circuit are fastened. The valves by way of a common supply air line are coupled to a pressure generator. The complex construction of the pressure distributor and in particular the sealing measures that are required for sealing interfaces are disadvantageous.

DE 10 2008 060 342 B3 discloses a 3/3 switchover valve assembly, capable of sequential extension, having a common coil and nozzle support for two actuators that are disposed on opposite sides of a fresh air duct. The fresh air duct is formed by sequentially placing a plurality of switchover valve assemblies, wherein part-portions of the fresh air duct run in the interior of the switchover valve assemblies, said part-portions being connected to the fresh air duct by a plug connection.

DE 10 2011 102 701 B4 shows a flow duct that is configured so as to be integral in a valve housing. Since the flow duct runs transversely to a plurality of bladder connectors and transversely to a motion axis of the valves, the valve housing that is composed of plastic by virtue of the multiplicity of dissimilar demolding directions is complex and expensive in production.

It is an object of the invention to specify a pressure distributor which is producible in a more simple and thus more cost-effective manner.

Said object is achieved by a pressure distributor according to the features of claim 1. Advantageous configurations are evident from the dependent claims.

A pressure distributor for a motor vehicle, in particular for pneumatic actuators in seats, is proposed. A pressure generator and a plurality of pneumatic actuators are connectable to the pressure distributor. Each actuator is assigned at least one electrically controllable valve which by way of a respective outlet in a controlled manner transmits to the actuator assigned to said valve a pressure that is generated by the pressure generator. The plurality of valves in the operation of the pressure distributor are provided with compressed air from the pressure generator by way of a common supply air line via a respective inlet. According to the invention, the common supply air line as a separate component is connected to the plurality of valves by way of a releasable connection.

A pressure distributor that is designed in such a manner can be produced with low complexity as compared to a pressure distributor having an integral supply air line. The pressure distributor that is typically produced from plastic can be made using a lower number of demolding directions. On account thereof, the pressure distributor can be produced using a more cost-effective tool and consequently in a more cost-effective manner. A further advantage lies in the higher flexibility in production, in terms of the number of the actuators that are to be supplied by the pressure distributor.

According to an expedient design embodiment, the common supply air line comprises a plurality of connector openings for connecting to a respective valve inlet. The connector openings on one or a plurality of sides of the supply air line lie in a respective line which runs/run parallel with a longitudinal axis of the supply air line. A respective extent of the axis openings runs perpendicularly to the line and to the longitudinal axis of the supply air line. The connector openings represent the outlets of the supply air line. A supply air line that is designed in such a manner can be provided in a simple and cost-effective manner. Moreover, the valves that are provided in the pressure distributor can be disposed beside one another such that a pressure distributor having a small installation height results. The width of the pressure distributor depends on the number of the valves that are to be supplied by way of the common supply air line.

According to an expedient design embodiment, it can be provided that the common supply air line comprises connector openings on one side or on opposite sides. By way of the latter alternative it is possible for the valves to be disposed on both sides of the common supply air line. On account thereof, in particular the width of the pressure distributor can be reduced by half at maximum.

According to a further expedient design embodiment, each of the valves comprises a connector port for connecting to the common supply air line, wherein a respective axis of extent of the connector ports runs approximately parallel with a respective axis of extent of the outlets. On account thereof, demolding can be performed in one direction or in opposite directions, on account of which the complexity of the production or demolding tool, respectively, can be reduced. On account thereof, the pressure distributor can be produced in a more simple and more cost-effective manner.

It can furthermore be provided that the connector ports and the outlets are disposed on one housing side of the valve.

Alternatively, the connector ports and the outlets can be disposed on opposite housing sides of the valve. Both variants permit the connector ports and the outlets of the valves to be demolded in one direction or in opposite directions, respectively, the producibility on account thereof being simple.

According to a further design embodiment, the connector ports and the assigned connector openings of the common supply air lines can be sealed by way of a respective annular seal, for example an O-ring, which is jammed between a connector port and a collar that encircles the connector opening that is assigned to the connector port. On account thereof, the common supply air line can be connected to a housing of the pressure distributor in a simple manner. By the provision of a respective annular seal it is ensured that the tightness between the connector port and the assigned connector opening is permanently provided.

According to a further expedient design embodiment, an inlet of the common supply air line can be provided with a mesh filter. On account thereof, foreign matter is prevented from invading the interior of the valves.

According to a further expedient design embodiment, the common supply air line in a cross section that is perpendicular to the direction of extent is tubular. In other words, that part of the common supply air line that extends to the valves is configured as a tube from which the number of connector openings branches off in the manner described above.

According to a further expedient design embodiment, the plurality of valves can be disposed in a common housing. Alternatively, the plurality of valves can be individual valves which by way of a plug connection are connected to one another and to the common supply air line.

According to a further expedient design embodiment, the valves are pneumatic solenoid valves having an air chamber (valve chamber) on which the outlet, the inlet that opens into the port, and at least one further air connector are provided, said outlet, inlet and further air connector being switchable by way of a plurality of switching positions of the solenoid valve with the intercalation of the air chamber. The solenoid valve in a manner known per se has a magnet coil, a yoke composed of soft magnetic material that is disposed on the magnet coil, and an armature that is movable relative to the yoke, which are likewise formed from soft magnetic material. In the solenoid valve, the magnetic circuit, that is to say the magnet coil, the yoke, and the armature, is disposed entirely within the air chamber of the valve. Furthermore, the armature in relation to the yoke is disposed in such a manner that said armature, when the magnet coil is energized, by means of the magnetic force generated on account thereof rotates counter to a restoring force about a single rotation axis until the magnetic force corresponds to the restoring force, wherein the size of at least one overlap region between the yoke and the armature changes during the rotation of the armature, and an air gap is configured between the yoke and the armature in the at least one overlap region. The spacing that is formed by the air gap between the yoke and the armature in the direction of the rotation of the armature remains substantially constant. This spacing, at least in portions, can also remain constant in the direction that is perpendicular to the rotation of the armature but, optionally, can also vary in said direction.

Such a solenoid valve has the advantage that by way of the substantially constant air gap a proportionally actuatable valve is achieved, such that no loud noise is created during the activation of the valve. The valve thus has minor switching noises. Moreover, it is achieved by the arrangement of the entire magnetic circuit in the air chamber that no further sealing planes which otherwise, by way of additional air gaps, reduce the effective magnetic circuit are required. Furthermore, efficient cooling of the magnet coil is ensured by respective air flows in the air chamber.

In a refinement, the solenoid valve is designed in such a manner that a constant (that is to say distance-independent) magnetic force or a magnetic force that increases in a linear manner over the path is configured when the magnet coil is energized. A magnetic force that increases in a linear manner can be achieved, for example, by way of a linear increase in the current of the magnet coil during the switching procedure of the valve. In this embodiment, the restoring force simultaneously increases during the rotation of the armature, on account of which it is achieved that the armature assumes a predefined terminal position. It is ensured herein that the restoring force increases at a faster pace than a magnetic force that potentially increases in a linear manner. The restoring force in the solenoid valve can be generated in various ways. To this end, in one preferred variant a leaf spring is attached to the armature.

An exemplary embodiment of the invention will be described in detail hereunder by means of the appended figures. In the figures:

FIG. 1 shows a sectional view of a pressure distributor according to an embodiment of the invention;

FIG. 2 shows a sectional plan view of the pressure distributor of FIG. 1;

FIG. 3 shows a sectional front view of the pressure distributor shown in FIG. 1.

Figure 4:
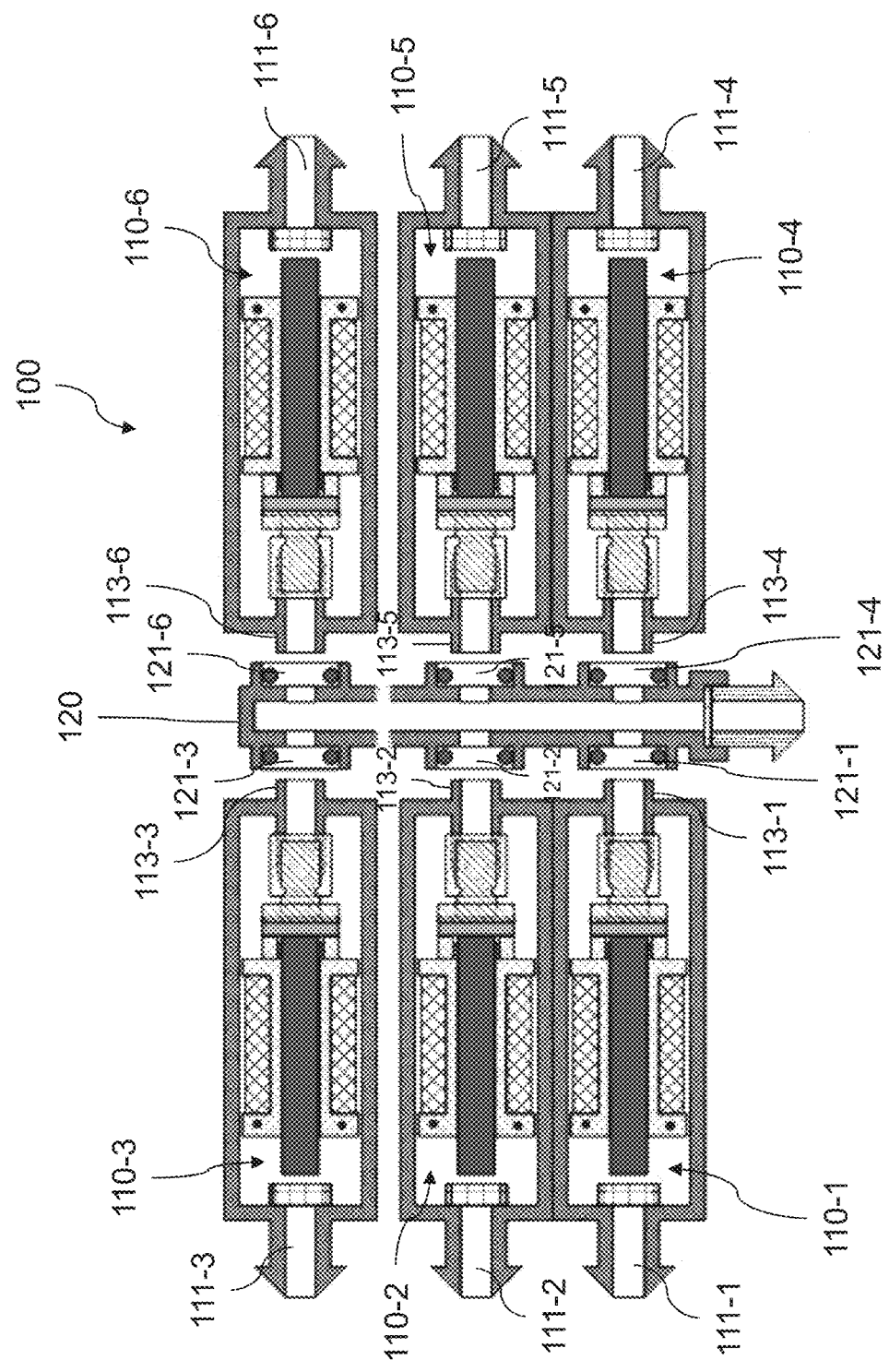
FIG. 4 shows a sectional plan view of a variant of a pressure distributor according to the invention.

An embodiment of the invention by way of a 3/2 solenoid valve will be described hereunder by means of FIGS. 1 to 3, said 3/2 solenoid valve being used for filling and venting an elastic air bladder (not shown) in a device for the pneumatic adjustment of a motor vehicle seat. The detailed construction of the solenoid valves that are used in the pressure distributor 100 will be described by means of the cross-sectional illustrations in FIGS. 1 and 3, only one valve being visible in said figures. A plan view of a pressure distributor according to the invention is shown in FIG. 2, said pressure distributor in an exemplary manner having two valves, wherein the reference signs for differentiating the components that are associated with the respective solenoid valve are followed by the indices "-1", "-2" (in general terms: "-n"). For the sake of simplicity, such indices have been dispensed with in FIG. 1 (and FIG. 3).

The solenoid valve 110 comprises an air chamber 1 having an outlet 111, an inlet 112, and an air outlet 4. The upper side of the air chamber is covered in an air-tight manner by a cover plate 14. A circuit board 16 is located above the cover plate 14, said circuit board 16 in turn being covered by means of a lid 15.

The outlet 111 of the air chamber 1 leads to the air bladder. Filling the air bladder is performed by a compressed air supply (not shown) which is connected to the inlet 112 and is connected to the air chamber 1. The upper opening 4 which with the intercalation of a damper element 23 made of foam is connected to the environment is used for venting or discharging, respectively, compressed air from the air bladder. The noises of the valve that are audible outside are reduced on account of the damper element.

A magnet coil 6 is arranged within the air chamber 1. This coil comprises a winding 601 which is wound onto a coil body 7. Furthermore, a U-shaped yoke 8 composed of soft magnetic material is disposed in the air chamber, wherein the lower leg of the U-shaped yoke extends through a cavity of the coil body 7. The upper leg of the yoke 8 runs past the winding 601 of the coil body and extends through an opening in an upper appendage of the coil body 7.

Furthermore, the armature 9 that is shown in the section and is composed of soft magnetic material and, when the coil 6 is energized, is rotated by means of magnetic force about a single rotation axis A, as is yet to be explained in more detail further below, is located within the air chamber 1. Openings are punched into the armature. The armature comprises in particular an upper opening 20, a T-shaped opening 22 that adjoins the former, and a lower opening 21. The openings 20 and 21 are designed so as to be square. The lower edge of the opening 21 bears on the lower leg of the yoke 8, on account of which a contact line is formed between the yoke and the armature, said contact line also representing the rotation axis A of the armature 9 when the coil 6 is energized.

A clip 10 from which a protrusion 11 projects is fastened to the armature 9, an elastic seal element 12 being located on said protrusion 11. In the non-energized state of the coil shown in FIG. 1, the seal element 12 bears on the opening 3, whereas the opening 4 is open. In this switching position of the valve, venting of the bladder by way of an air flow from the connector 2 via the air chamber 1 toward the opening 4 is performed.

The coil body 7 comprises a guiding cam 13 which prevents tilting of the rotation axis A of the armature 9 in that the guiding cam is guided in the opening 22. When the coil 6 is energized, a magnetic force which pulls the armature 9 toward the yoke 8 is generated. Herein, the four edges of the upper square opening 20 and the upper end of the yoke 8 overlap. A corresponding overlap of three edges of the lower opening 21 and the lower end of the yoke 8 is likewise enlarged. In the terminal position of the armature 9, when the coil is energized, the armature 9 is no longer tilted in relation to the yoke 8 but extends in the vertical direction.

In the magnet coil, the air gap between the edges of the upper square opening 20 and the yoke 8, and the air gap between the edges of the lower square opening 21 and the yoke 8, in the direction of the rotation of the armature remains substantially constant, independently of the size of the overlap between the yoke and the armature. It is to be noted that there is no air gap along the lower edge of the opening 21, since there the yoke and the armature contact one another directly on a contact line. The rotation axis A of the armature runs along said contact line, as has already been mentioned at the outset.

The size of the air gap along the edges of the opening in the exemplary embodiment shown is constant. However, it is not mandatory for this to be implemented in such a manner. Rather, it is decisive that the spacing created by the air gaps between the armature 9 and the yoke 8 remains constant in the rotation direction of the armature, that is to say along respective lines that run perpendicularly to the sheet plane. By contrast, the size of the air gap along the circumference of the openings 20 and 21 can optionally vary. In particular, the left and the right side of the air gap can also run downward in a slightly oblique manner, for example. It is achieved on account thereof that the armature in the region of the rotation axis A is centered in relation to the yoke. The size of the air gap at the remaining edges is approximately 0.2 mm.

It is achieved on account of the substantially constant air gap in the direction of the rotation of the armature 9 that the magnetic force acting on the armature depends only on the current and not on how close the armature has come to the yoke. As opposed to conventional solenoid valves in which the air gap is reduced as the armature is increasingly displaced, the magnetic force being increased on account thereof, a proportional valve, the magnetic force of which is constant when the coil is constantly energized, is achieved by way of the solenoid valve. A leaf spring 19 which acts counter to the magnetic force and thus generates a restoring force (cf. FIGS. 1 and 3) is herein furthermore provided in the solenoid valve 110. The leaf spring in the upper region is fastened to the coil body 7, and in the lower region is fastened to the armature 9 and to the clip 10. The restoring force is continuously increased as the armature is increasingly rotated when the coil is energized, until said restoring force is finally equal to the constant magnetic force, on account of which the terminal position of the armature is reached.

The energizing of the coil leads to a rotation of the armature 9 about the rotation axis A. In the terminal position shown in FIG. 2, the seal element 12 then bears in a sealing manner on the upper opening 4, whereas the opening 114 of the air duct of the inlet 112 is now open. In this switching position, compressed air that emanates from a compressed air supply is guided by way of the inlet 112, the chamber 1, and the outlet 111, toward the air bladder in order for the latter to be filled. The valve of FIGS. 1 to 3 thus represents a 3/2 switchover valve having three air connectors and two switching positions.

The energizing of the winding 601 of the coil 6 is performed by way of electrical pins 17 which extend through an opening of the cover plate 14 and are connected to a respective electrical contact of the circuit board 16. The opening in the cover plate herein is sealed, for example by adhesive bonding, press fitting, or injecting. No air from the pressurized air chamber 1 thus exits by way of this opening. A mesh filter 18 which avoids the ingress of particles from the elastic air bladder into the air chamber 1 can be further seen in FIG. 1.

The opening 22 of the armature 9 has the shape of an upside-down letter T, wherein the guiding cam 13 which prevents lateral tilting of the armature 9 engages in the vertical beam of the letter T. By contrast, the vertical beam of the letter T serves for an upper latching cam 10a of the clip 10 to pass through.

The leaf spring 19 mentioned above is composed of a sheet metal which is bent at four locations 19a. The leaf spring at the upper end has the shape of a T. The fastening of the leaf spring to the coil body 7 is performed there. A projecting tab having a clearance is located within a central opening of the leaf spring. In the installed state of the leaf spring, the tab bears on the internal face of the clip 10, wherein the latching cam 10a of the clip 10 has been pushed over the clearance. The lower part of the armature 9 is inserted into the clip 10 having the tab inserted therein. The armature herein is latched to the clip 10 by way of the latching cam 10a and the two lower latching cams 10b. A respective restoring force is generated by the tab being bent in relation to the remaining part of the leaf spring 19. Said restoring force, during the increasing rotation of the armature when the coil is energized, becomes greater until the terminal position at which the magnetic force generated corresponds to the restoring force of the leaf spring has finally been reached.

In the installed state, a force which pulls the armature 9 upward and in the direction toward the magnet coil in order for the rotation axis A of the armature 9 to be fixed is generated on the one hand by means of the leaf spring 19. On the other hand, the deformation of the leaf spring at the height level of the rotation axis A generates a torque which tilts the armature away from the coil 6 and simultaneously urges the seal element 12 onto the lower opening 3 of the air duct 5. This torque is absorbed by the latch-fitting of the leaf spring at the upper end of the coil carrier 7.

The essential component parts of the solenoid valve from the preceding figures, and the technical effects of said component parts, will be explained once again hereunder. In the solenoid valve, the magnetic circuit composed of the magnet coil 6, the yoke 8, and the armature 9 is located in a common air chamber 1, i.e. within the pneumatically operated region of the valve. Cooling of the magnet coil can be effected in this way in that the pneumatic air flow is guided along the winding, this being ensured by the arrangement of the air connector 2 and of the air connectors 3 and 4 at opposite ends of the air chamber 1. The arrangement of the magnetic circuit within the air chamber furthermore has the advantage that no further sealing planes which otherwise reduce the magnetic efficiency on account of additional air gaps are required.

The air gaps in the overlapping region between the armature and the yoke are substantially constant in the rotation direction of the armature, on account of which a constant magnetic force which leads to a silent switching procedure of the valve is achieved when the coil is energized in a constant manner. The magnetic force, on account of the coil being increasingly energized in a linear manner, can optionally also be slightly increased. The increasing restoring force of the leaf spring herein ensures that a predefined terminal position of the armature is reached. Guiding the armature by means of the guiding cam 13 has the effect that only one degree of freedom is possible in terms of the movement of the armature, specifically the rotation of the latter about the axis A. On account of the arrangement of the armature having the clip 10 fastened thereto and the respective seal element 12, a lever mechanism is moreover achieved since the spacing between the rotation axis A and the upper end of the armature is larger than between the rotation axis and the position of the seal element 12. The force by way of which the seal element is urged against the opening 4 is amplified in this manner. Thus, a high force is achieved for sealing the opening 4 while at the same time achieving a small valve lift.

The valve 110 as a rotation axis A has a contact line between the armature 9 and the yoke 8, which in magnetic terms acts as a minimal air gap, on account of which the lost output of the magnetic circuit is minimized. The armature 9 of the magnetic circuit has respective punched features for the ends of the yoke 9 and the guiding cam 13 of the coil body 7 to pass through. The gap between the armature and the guiding cam herein has to have tighter tolerances than the gap between the armature and the yoke. The yoke 8 in the case of the non-energized solenoid valve passes only partially through the openings in the armature, as the overlapping area of the air gap cannot be further increased in the case of said yoke 8 passing through completely, as this would result in a magnetic force no longer being generated.

The elastic sealing faces of the seal element 12 which serves for sealing the openings 3 and 4 by tilting the armature 9 in mechanical terms are guided such that said sealing faces at all times come to bear at the same position on the associated openings. This improves the tightness in particular in the case of low temperatures.

The interior of the coil 6 (that is to say the cavity of the coil body 7) in the solenoid valve 110 is not used for guiding air but exclusively for receiving the soft magnetic yoke 8. On account thereof, the coil in terms of diameter can be constructed so as to be comparatively small, this in turn increasing the electrical efficiency (shorter wire length and lower winding resistance, respectively; alternatively a higher number of windings). It is herein additionally advantageous for the coil in the case of a given number of windings to be constructed so as to be as thin and long as possible.

As is further shown in the cross-sectional illustration of FIG. 1, the outlet 111 and the inlet 112 of the valve 110 are disposed on opposite sides. The axes of extent of the outlet 111 and of the inlet 112 herein run so as to be mutually parallel. As can be derived from the plan view of FIG. 2, the axes of extent of the outlet 111 and of the inlet 112 that is assigned to the same valve even run in one line, this however not being mandatory. On account of this design embodiment, demolding of the housing that is composed of plastic is simplified, since only four opposite demolding directions are required to this end. The housing 24 can be produced using a simple tool as a result.

As can be derived from the cross-sectional illustration of FIG. 1 and from the sectional plan view in FIG. 2, the inlet 112 has a connector port 113 which protrudes beyond the housing wall 25. The connector port 113 is provided to be connected to a respective assigned outlet of a supply air line 120. Proceeding from the cross-sectional illustration of FIG. 1, the supply air line 20 extends perpendicularly into the sheet plane. As is illustrated by FIG. 2, the supply air line 120 thus runs transversely to a number of adjacent valves. In the variant according to FIG. 2, two valves 110-1, 110-2 which are disposed beside one another are provided in a merely exemplary manner, said valves 110-1, 110-2 being disposed in a common valve housing 24 in a likewise merely exemplary manner. As has already been mentioned at the outset, the valves 110-1, 110-2 are of identical construction, which corresponds to the construction described in conjunction with FIG. 1.

Connector openings 121 that are assigned to the inlets 112 open into a duct 127 of the supply air line 120. The supply air line 120 is closed at one end. The supply air line 120 at the other, opposite end thereof has an inlet 123. The inlet 123 is connected to a connector piece 126. A mesh filter 124 is disposed between the inclusion piece 126 and the inlet 123 in order to prevent that foreign matter reaches the interior of the air chamber 1 of the valves 110.

The supply air line 120, merely for illustrative purposes, in the illustration according to FIG. 2 has a larger number of connector openings 121-$x$ (where x is greater than 2) than the pressure distributor 100 has valves 110. In principle, it can be provided that the number of connector openings 121 and thus the length of the supply air line is adapted to the number of valves 110 that are disposed beside one another. To the extent that this is not the case, as is shown in FIG. 2, the outlet openings that are not required must be closed with a blank plug, for example.

The connector openings 121-$m$ (where m=1 to x) comprise a collar 122-$m$. A respective seal 125-$m$ is placed into the interior of the collar 122-$m$. The seal 125-$m$ is an O-ring, for example.

In order for an operationally ready pressure distributor to be produced, the supply air line 120 shown in FIG. 2 is plug-fitted onto the connector ports 113-$n$ in a manner transversely to the direction of extent of said supply air line 120, that is to say in the horizontal direction from right to left in the image plane (where n=2 in the exemplary embodiment). A respective seal 125-$m$ herein is press-fitted between the external wall of the connector ports 113-$n$ and the assigned collar 122-$m$, on account of which a seal is provided.

In a modification, a respective inlet 112-$n$ and a respective outlet 111-$n$ of a valve 110-$n$ could also be disposed on the same housing side. To this end, the inlet 112-$n$ and the inlet 111-$n$ would be disposed so as to be mutually offset on the housing side in such a manner that a connection of the supply air line 120 is implementable in the manner described, on the one hand, and a connector to a connection to the respective actuator is implementable, on the other hand.

FIG. 4 shows a variant of a pressure distributor according to the invention, in which a number of connector openings 121-$m$ are provided on opposite sides of the supply air line 120. In the present exemplary embodiment, three valves 110-1, 110-2, and 110-3 are in each case illustrated in an exemplary manner on the left side of the supply air line 120. In an analogous manner, three valves 110-4, 110-5, and 110-6 are likewise illustrated on the right side of the supply air line 120. By contrast to the exemplary embodiment described in FIGS. 1 to 3, the valves 110-n are individual valves, that is to say valves which each have separate valve housings. The valve housings of the individual valves 110-n can be mechanically interconnected. This can be implemented, for example, by a latch-fitting of adjacent valves, in the case of respective latching elements being provided. A mechanical connection can also be performed by a clamp and the like that encloses the number of valves.

The pressure distributor 100 in this exemplary embodiment shown is assembled in an analogous manner in that the connector openings 121-m and the corresponding connector ports 113-n are connected the valves 110-n to one another. A pressure distributor that is implemented in such a manner has geometric dimensions that are different when compared to a pressure distributor in which the same number of valves are disposed on one side of the supply air line 120. The functional mode is analogous.

The advantage of the common supply air line that is provided as a separate component lies in that the valve housings (either a common valve housing for a plurality of valves, or the valve housing of a single valve) makes do with a lower number of demolding directions such that the valve housing is capable of being provided in a more cost-effective manner. Moreover, the provision of a common supply air line as a separate component permits dissimilar configurations of the geometric arrangement of the valves such that a correspondingly optimized pressure distributor can be provided according to the prevailing space conditions.

LIST OF REFERENCE SIGNS

1 Air chamber
4 Air connection
6 Magnet coil
601 Winding of the magnet coil
7 Coil body of the magnet coil
8 Yoke
9 Armature
10 Clip
10a, 10b Latching cams of the clip
11 Protrusion of the clip
12 Seal element
13 Guiding cam of the coil body
14 Cover plate
15 Lid
16 Circuit board
17 Pin
18 Mesh filter
19 Leaf spring
20, 21, 22 Openings in the armature
23 Damper element
24 Housing
25 Housing wall
A Rotation axis
100 Pressure distributor
110-n Valve
111-n Outlet
112-n Inlet
113-n Connector port
114 Opening
120 Supply air line
121-m Connector opening
122-m Collar
123 Inlet of the supply air line
124 Mesh filter
125-m Seal
126 Connector piece
127 Duct

The invention claimed is:

1. A pressure distributor for a motor vehicle, in particular for pneumatic actuators in seats, comprising:
a pressure generator and a plurality of pneumatic actuators configured to be connectable to the pressure distributor, wherein each actuator is assigned at least one electrically controllable valve, which by way of a respective outlet, in a controlled manner, transmits to the actuator assigned to the at least one electrically controllable valve a pressure that is generated by the pressure generator, wherein a plurality of the at least one electrically controllable valve, in operation of the pressure distributor, is provided with compressed air from the pressure generator by way of a common supply air line via a respective inlet,
wherein the common supply air line, as a separate component, is connected to the plurality of the at least one electrically controllable valve by way of a releasable connection,
wherein the plurality of the at least one electrically controllable valve are solenoid valves comprising an air chamber on which an outlet, an inlet that opens into a port, and at least one further air connector are provided, the outlet, inlet and further air connector being switchable by way of a plurality of switching positions of the solenoid valve with interconnection of the air chamber, wherein the solenoid valve comprises a magnet coil, a yoke composed of soft magnetic material that is disposed on the magnet coil, and an armature composed of soft magnetic material that is movable relative to the yoke, wherein
the magnet coil, the yoke, and the armature are disposed within the air chamber;
the armature in relation to the yoke is disposed in such a manner that the armature, when the magnet coil is energized, by magnetic force generated on account thereof rotates counter to a restoring force about a single rotation axis until the magnetic force corresponds to the restoring force, wherein size of at least one overlap region between the yoke and the armature changes during rotation of the armature, and an air gap is configured between the yoke and the armature in the at least one overlap region, wherein spacing that is formed by the air gap between the yoke and the armature in direction of the rotation of the armature remains substantially constant.

2. The pressure distributor as claimed in claim 1, wherein the common supply air line comprises a plurality of connector openings for connecting to the respective inlet, wherein the connector openings on at least one side of the common supply air line lie in a respective line which runs parallel with a longitudinal axis of the common supply air line, wherein a respective axis of extent of the connector openings runs perpendicularly to the line and to the longitudinal axis of the common supply air line.

3. The pressure distributor as claimed in claim 2, wherein the common supply air line comprises connector openings on at least one of one side and opposite sides.

4. The pressure distributor as claimed in claim 2, wherein connector ports and the respective connector openings of the common supply air line are sealed by way of a respective annular seal which is jammed between at least one of the connector ports and a collar that encircles at least one of the respective connector openings.

5. The pressure distributor as claimed in claim 1, wherein each of the plurality of the at least one electrically controllable valve comprises a connector port configured to connect to the common supply air line, wherein a respective axis of extent of the connector ports runs approximately parallel with a respective axis of extent of the outlets.

6. The pressure distributor as claimed in claim 5, wherein the connector ports and the outlets are disposed on one respective housing side of the at least one electrically controllable valve.

7. The pressure distributor as claimed in claim 5, wherein the connector ports and the outlets are disposed on opposite housing sides of the electrically controllable valve.

8. The pressure distributor as claimed in claim 1, wherein an inlet of the common supply air line is provided with a mesh filter.

9. The pressure distributor as claimed in claim 1, wherein the common supply air line in a cross section that is perpendicular to direction of extent is tubular.

10. The pressure distributor as claimed in claim 1, wherein the plurality of the at least one electrically controllable valve are disposed in a common housing.

11. The pressure distributor as claimed in claim 1, wherein the plurality of the at least one electrically controllable valve are individual valves which by way of a plug connection are connected to one another and to the common supply air line.

12. The pressure distributor as claimed in claim 1, wherein the solenoid valve is configured so that at least one of a constant magnetic force and a magnetic force that increases in a linear manner is formed via energizing the magnet coil, and the restoring force increases during rotation of the armature.

* * * * *